United States Patent [19]

Scott et al.

[11] Patent Number: 4,529,739

[45] Date of Patent: Jul. 16, 1985

[54] FOAMED POLYMERIC MATERIALS

[75] Inventors: Laurie J. Scott; Robert E. Erickson; Theodore C. Wallace, all of Midland, Mich.

[73] Assignee: The Dow Chemical Company, Midland, Mich.

[21] Appl. No.: 633,833

[22] Filed: Jul. 24, 1984

[51] Int. Cl.³ .............................................. C08J 9/30
[52] U.S. Cl. ....................................... 521/72; 521/66
[58] Field of Search ......................................... 521/72

[56] References Cited

U.S. PATENT DOCUMENTS 2,858,282 10/1958 Fairclough ............................ 521/72
3,083,124 3/1963 Rahmes ................................. 521/72
3,663,462 5/1972 Arndt et al. .......................... 521/72
3,926,891 12/1975 Gross et al. ....................... 525/329.6
4,190,562 2/1980 Westerman .......................... 526/317

Primary Examiner—Morton Foelak

[57] ABSTRACT

Foamed water-swellable polymeric water absorbent materials are prepared by contacting a polymer capable of having a water-swellable character and containing acid moieties in acid form with a blowing agent such as sodium bicarbonate, which blowing agent is capable of neutralizing the acid moieties of the polymer. The foamed polymers are useful in a wide variety of water absorbent applications.

10 Claims, No Drawings

FOAMED POLYMERIC MATERIALS

BACKGROUND OF THE INVENTION

The present invention relates to polymeric materials, and in particular to those polymeric materials which are employed in the form of a foam.

Water-swellable hydrophilic polymers are useful as absorbents for water. Examples of such polymers and uses, thereof, are disclosed in U.S. Pat. Nos. 3,926,891; 4,190,562; 4,293,609 and 4,424,247. Examples of disposable absorbent articles containing water absorbent polymers are disclosed in U.S. Pat. No. 3,888,257.

It has been common practice to employ high molecular weight water-swellable hydrophilic polymers in water absorbent applications. Such high molecular weight polymers provide desirable properties such as increased water absorbency and high gel strengths. Unfortunately, such high molecular weight polymers are extremely viscous and are difficult to formulate.

In view of the deficiencies of the prior art, it would be highly desirable to provide a process for preparing polymeric materials which can be easily formulated for use in applications such as those involving the absorption of aqueous fluids.

SUMMARY OF THE INVENTION

The present invention is a process for preparing a foamed water-swellable polymeric water absorbent material, said process comprising contacting a polymer capable of having a water-swellable character and containing a functionally effective amount of acid moieties in acid form, with a blowing agent which is capable of neutralizing an effective amount of acid moieties.

In another aspect, the present invention is a process for preparing a foamed water-swellable polymeric water absorbent material, said process comprising contacting a polymer capable of having a hydrophilic character and containing a functionally effective amount of acid moieties in acid form, with a blowing agent which is capable of neutralizing an effective amount of acid moieties and said polymer is simultaneously subjected to crosslinking.

In yet another aspect, the present invention is the foamed water-swellable polymer water absorbent material which can be prepared via the processes of this invention.

Surprisingly, the foamed polymeric materials of this invention are highly porous, highly aerated and can be flexible. The foamed materials dry quickly, generally having an open cell structure and low density.

The foamed polymeric materials of this invention have a wide variety of uses. That is, numerous articles can comprise the polymeric materials of this invention. Of particular interest are those uses wherein polymeric materials are used as water absorbent materials.

DETAILED DESCRIPTION OF THE INVENTION

The water-swellable hydrophilic polymers useful in this invention preferably can be any of the known hydrophilic polymers that can be foamed as described hereinbefore. Preferred hydrophilic polymers are most preferably lightly crosslinked or are capable of being lightly crosslinked. Such hydrophilic polymers include acrylic copolymers, starch/graft copolymers, water-insoluble alkali salt of saponified, gelatinized starch/polyacrylonitrile graft polymers, and the like. Examples of suitable monomers, polymers and crosslinking agents are disclosed in U.S. Pat. Nos. 3,997,484; 3,926,891; 3,395,099; 4,090,013; 4,190,562; 4,405,387. Especially preferred polymers are disclosed in U.S. Pat. Nos. 4,117,184; 4,176,677; 4,293,609; and 4,424,247; which are incorporated herein by reference.

The preferred hydrophilic polymers useful in this invention are polyelectrolytes exemplary of which are ammonium or alkali metal salts of homopolymers of acrylic, methacrylic acid, itaconic acid, and the like, as well as copolymers thereof with one or more ethylenically unsaturated comonomers. These polymers contain a functionally effective amount of acid moieties in acid form, as is required in the process of this invention. Examples of suitable monomers useful in preparing polymers; polymers and copolymers; crosslinking agents; etc. are disclosed in the aforementioned U.S. Pat. No. 4,424,247.

Also useful of this invention are polymers comprising polymerized sulfonate monomers which can be used in place of or in addition to the aforementioned acrylate monomers. Examples of suitable water-soluble, ethylenically unsaturated sulfonate monomers include N-sulfoalkyl, $\alpha,\beta$-ethylenically unsaturated amide salts such as the alkali metal salts of 2-acrylamido-2-methylpropane sulfonic acid, 2-acrylamido propane sulfonic acid, 2-acrylamido ethane sulfonic acid as well as other such monomers listed in U.S. Pat. No. 3,692,673 which is hereby incorporated by reference; alkali metal salts of sulfoalkyl esters of unsaturated carboxylic acids such as 2-sulfoethyl methacrylate and other such sulfoalkyl esters as listed in U.S. Pat. No. 4,075,134 which is also incorporated by reference; salts of sulfoarylalkenes such as vinylbenzyl sulfonic acid and the various salts of vinylbenzyl sulfonate, p-styrene sulfonic acid, salts of sulfoalkenes such as vinyl sulfonic acid, and the like. Of the foregoing sulfonate monomers, the sulfoalkyl derivatives of acrylamide and methacrylamide are preferred with those of acrylamide being especially preferred, particularly the sodium and potassium salts of 2-acrylamido-2-methylpropane sulfonic acid (AMPS), and 2-acrylamido-2-propane sulfonic acid. In the most preferred embodiments, the sulfo group is employed in the form of an alkali metal sulfonate such as sodium sulfonate.

For the purpose of this invention, a moisture absorbent or water-swellable polymer or polyelectrolyte is one that absorbs several times its weight of an aqueous liquid, preferably more than about 15 times its weight in water. The amount of water which a particular polymer will absorb (i.e., the water absorbent capacity) is dependent upon the pH of the aqueous medium which is being absorbed, the molecular weight of the polymer, the amount of ionic character of the polymer, the amount of crosslinking in the polymer, among other factors. In addition, for purposes of this invention, a polymer capable of having a water-swellable character is that polymer which can be modified (e.g., by hydrolysis) in order to provide a swellable character. Advantageously, such polymers are lightly crosslinked.

The polymers of this invention require a functionally effective amount of acid moieties in acid form. By this is meant that there is a sufficient number of acid moieties pendant from said polymer backbone to provide a foamed product when said acid moieties are neutralized with said blowing agent. If the amount of acid moieties is very small, a small amount of foaming will occur.

Typically, the amount of acid moieties in acid form varies from about 1 to about 60, preferably from about 40 to about 50 weight percent, based on monomers containing acid moieties which are polymerized to form the polymer.

The blowing agent capable of neutralizing the acid moieties and capable of forming a foamed product is any agent which can provide foam forming behavior upon neturalization reaction with the acid moieties. Examples of those agents are those that provide gases such as carbon dioxide upon neutralization with the acid moiety. Suitable examples include sodium carbonate, ammonium carbonate, sodium bicarbonate, ammonium bicarbonate, magnesium carbonate, zinc carbonate, and the like.

The process of this invention is performed by contacting the polymer (and optionally crosslinking agent if necessary) with the neutralizing blowing agent under conditions such that neutralization will occur (and under conditions which crosslinking will occur if crosslinking agent is employed). This typically requires that the polymer be dispersed in an aqueous medium which contains the neutralizing blowing agent. The polymer (and optional crosslinking agent) and neutralizing blowing agent can be contacted in a reactor under pressure and the foam released, or can be contacted under multi-feed conditions such that foaming occurs. If desired, the polymer can be simultaneously hydrolyzed. The foamed polymer is then dispersed in a gaseous medium, such as air, such that foam forming gases and excess water are given off.

If desired, the polymer, (and optional crosslinking agent if necessary) and neutralizing blowing agent can be contacted with a hydrolyzing agent. The polymer is then subjected to hydrolysis (and crosslinking conditions if necessary) while the acid moieties of the polymer are neutralized with the neutralizing blowing agent. Thus, it is possible to perform the process of this invention employing a polymer as a starting material which is in the form of a latex.

The process provides an improved means for providing high molecular weight materials exhibiting high water absorbent capacities and high gel strengths. Foamed polymeric materials of this invention are low density, highly porous, highly aerated, have an open cell structure, can be flexible and generally dry quickly. The foamed polymeric materials of this invention can be applied to various substrates and further dried.

The compositions of this invention can be incorporated into film laminates and other such materials as are described, for example, in U.S. Pat. Nos. 4,117,184; 4,176,677; 4,293,609 and 4,424,247. For example, thoroughly mixed powder/polymer compositions can be incorporated in wicking substrates and treated as described in U.S. Pat. No. 4,293,609. Such materials exhibit high water absorbent capabilities.

The following examples are presented to further illustrate but not limit the scope of this invention. All parts and percentages are by weight.

EXAMPLE 1

100 g of a latex dispersion in water and having 40 percent solids comprises a polymer having 75 percent ethyl acrylate polymerized with 25 percent methacrylic acid. To this mixture is added with agitation 50 g of an aqueous solution comprising 9.76 g sodium bicarbonate, 2.1 g polyoxyethylene sorbitan monolaurate surfactant formulation sold as Tween ®20, and 0.24 g polyamide epichlorohydrin crosslinking agent formulation sold as Polycup ®172, and 52 g of an aqueous solution comprising 4.65 g sodium hydroxide. The mixture is held under a pressure less than 700 psi until the dispersion is released through an extrusion die at about 80° C. onto tissue paper.

EXAMPLE 2

A latex dispersion in water having 46.2 percent solids comprises a polymer having 75 percent ethyl acrylate and 25 percent methacrylic acid in polymerized form. To 204.3 parts of this dispersion is mixed 5 parts polyoxyethylene sorbitan monolaurate formulation, and 4.8 parts polyamidepolyimine epichlorohydrin adduct formulation. A slurry of 54.7 percent sodium bicarbonate in water is also prepared. The latex dispersion and the sodium bicarbonate slurry are mixed on a 3.6:1 basis. The mixture is agitated in a mixing/pumping device equipped with a mixing head and spray nozzle. A spray of the mixture is deposited on a glass plate preheated to 121° C. which is slowly moved under the spray nozzle. A uniform layer of wet, fine celled, foamed polymer is deposited on the glass plate. The glass plate on which the polymer is deposited is placed in a hot air oven at 121° C. for 3 minutes. The essentially dry absorbent foam polymer shows an absorbent capacity of 31 g of a one percent sodium chloride aqueous solution per gram of absorbent foam polymer.

What is claimed is:

1. A process for preparing a foamed water-swellable polymeric water absorbent material, said process comprising contacting an aqueous polymer dispersion said polymer capable of having a water-swellable character and containing a functionally effective amount of pendant acid moieties in acid form with a carbon dioxide yielding compound decomposeable blowing agent which is capable of neutralizing an effective amount of pendant acid moieties.

2. A process of claim 1 wherein said polymer capable of having a water-swellable character is lightly crosslinked.

3. A process of claim 1 wherein said polymer is in the form of a latex.

4. A process of claim 1 wherein said polymer is simultaneously hydrolyzed.

5. A process of claim 1 wherein said polymer comprises from about 1 to about 60 weight percent of monomers containing acid moieties which are polymerized to form said polymer.

6. A process for preparing a foamed water-swellable polymeric water absorbent material, said process comprising contacting an aqueous polymer dispersion said polymer capable of having a hydrophilic character and containing a functionally effective amount of pendant acid moieties in acid form with a carbon dioxide yielding decomposable compound blowing agent which is capable of neutralizing an effective amount of pendant acid moieties and said polymer is simultaneously subjected to crosslinking.

7. A process of claim 6 wherein said polymer capable of having a water-swellable character is lightly crosslinked.

8. A process of claim 6 wherein said polymer is in the form of a latex.

9. A process of claim 6 wherein said polymer is simultaneously hydrolyzed.

10. A process of claim 6 wherein said polymer comprises from about 1 to about 60 weight percent of monomers containing acid moieties which are polymerized to form said polymer.

* * * * *